US011628392B2

(12) United States Patent
Schmidt et al.

(10) Patent No.: US 11,628,392 B2
(45) Date of Patent: Apr. 18, 2023

(54) ABSORPTION COLUMN HAVING EXTERNAL HEAT EXCHANGE CIRCUIT

(71) Applicant: L'Air Liquide, Société Anonyme pour l'Etude et l'Exploitation des Procédés Georges Claude, Paris (FR)

(72) Inventors: Sophia Schmidt, Frankfurt am Main (DE); Dorit Rappold, Frankfurt (DE); Christian Frey, Frankfurt am Main (DE); Sharon Corbet, Frankfurt (DE); Alfred Gubrinski, Frankfurt am Main (DE)

(73) Assignee: L'Air Liquide, Société Anonyme pour l'Etude et l'Exploitation des Procédés Georges Claide, Paris (FR)

( * ) Notice: Subject to any disclaimer, the term of this patent is extended or adjusted under 35 U.S.C. 154(b) by 361 days.

(21) Appl. No.: 16/637,033

(22) PCT Filed: Aug. 2, 2018

(86) PCT No.: PCT/EP2018/025209
§ 371 (c)(1),
(2) Date: Feb. 6, 2020

(87) PCT Pub. No.: WO2019/029846
PCT Pub. Date: Feb. 14, 2019

(65) Prior Publication Data
US 2020/0238213 A1    Jul. 30, 2020

(30) Foreign Application Priority Data
Aug. 7, 2017    (EP) ...................................... 17400049

(51) Int. Cl.
*B01D 53/18* (2006.01)
*C01B 3/52* (2006.01)
(Continued)

(52) U.S. Cl.
CPC ................ *B01D 53/18* (2013.01); *C01B 3/52* (2013.01); *C10K 1/004* (2013.01); *C10K 1/005* (2013.01);
(Continued)

(58) Field of Classification Search
None
See application file for complete search history.

(56) References Cited

U.S. PATENT DOCUMENTS 4,324,567 A        4/1982  Ranke et al.
2007/0221065 A1*   9/2007  Aroonwilas ........... B01D 53/14
                                                    96/243

(Continued)

FOREIGN PATENT DOCUMENTS

DE    10 2015 101 415    8/2016
EP        3 132 840      2/2017
GB        1 071 929      6/1967

OTHER PUBLICATIONS

Ullmann's Encyclopedia of Industrial Chemistry, 6$^{th}$ Ed. vol. 15, 399-407.

(Continued)

*Primary Examiner* — Philip Y Louie
(74) *Attorney, Agent, or Firm* — Elwood L. Haynes

(57) ABSTRACT

An absorption column including at least one external heat exchange circuit for cooling or heating the absorption liquid, including one or more serially connected heat exchangers, wherein the junction of the pipeline for withdrawal of the absorption liquid from the column is disposed above the junction of the pipeline into the first heat exchanger in the flow direction, wherein the pipeline also includes a dumped bed.

4 Claims, 1 Drawing Sheet

(51) Int. Cl.
   *C10K 1/00* (2006.01)
   *B01D 53/14* (2006.01)

(52) U.S. Cl.
   CPC .. *B01D 53/1456* (2013.01); *B01D 2252/2021* (2013.01); *B01D 2252/2026* (2013.01); *B01D 2252/20468* (2013.01); *B01D 2252/20489* (2013.01); *C01B 2203/0415* (2013.01)

(56) References Cited

U.S. PATENT DOCUMENTS

| | | |
|---|---|---|
| 2014/0190350 A1 | 7/2014 | Weiss et al. |
| 2014/0190351 A1 | 7/2014 | Weiss et al. |
| 2018/0028961 A1 | 2/2018 | Chaubet et al. |

OTHER PUBLICATIONS

International Search Report and Written Opinion for corresponding PCT/EP2018/025209, dated Oct. 9, 2018.

\* cited by examiner

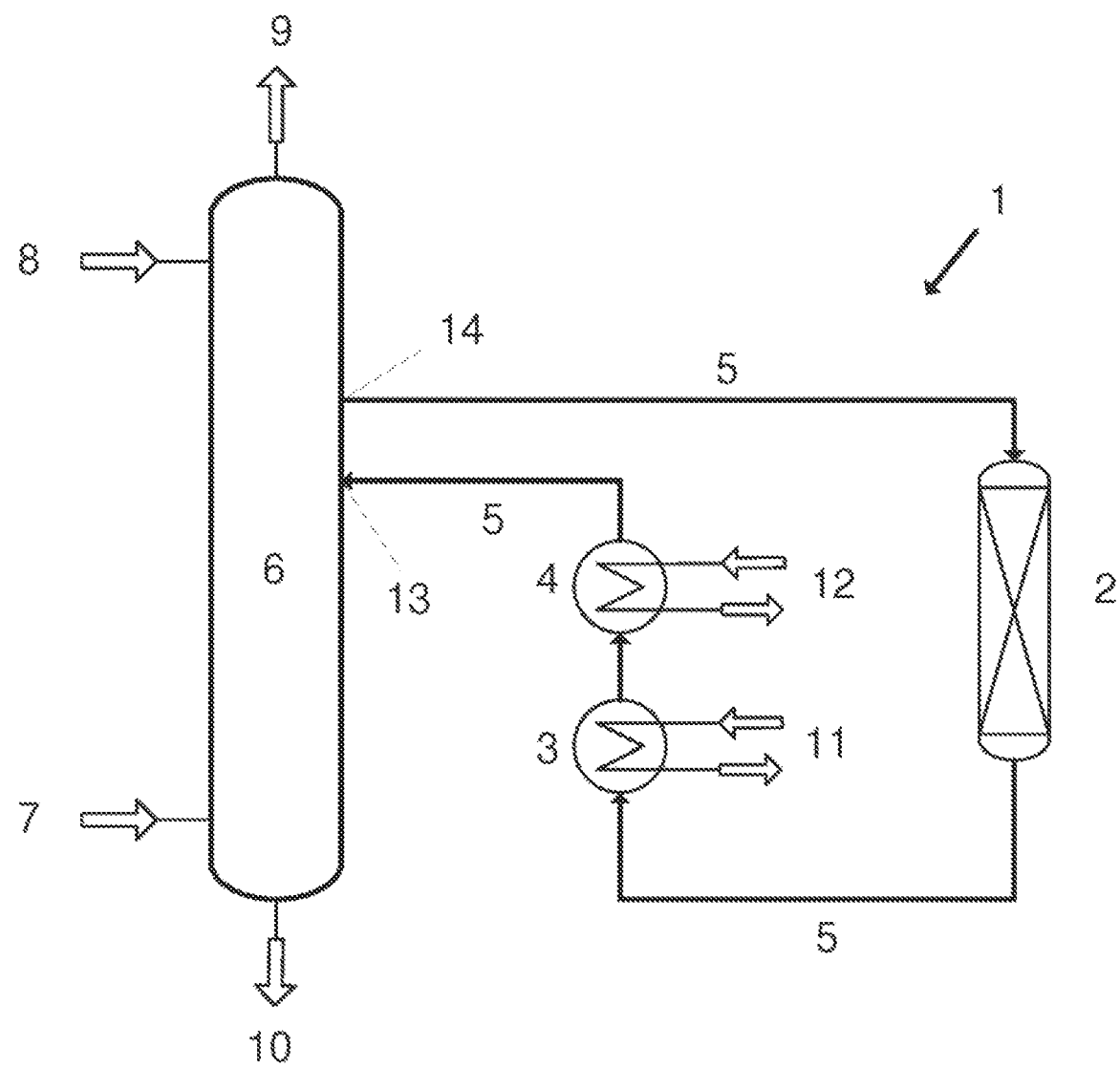

ABSORPTION COLUMN HAVING EXTERNAL HEAT EXCHANGE CIRCUIT

CROSS REFERENCE TO RELATED APPLICATIONS

This application is a 371 of International PCT Application PCT/EP2018/025209, filed Aug. 2, 2018, which claims priority to European Patent Application EP 17400049.7, filed Aug. 7, 2017, the entire contents of which are incorporated herein by reference.

FIELD OF THE INVENTION

The invention relates to an absorption column comprising at least one external heat exchange circuit for cooling or heating the absorption liquid, comprising one or more serially connected heat exchangers, wherein the junction of the pipeline for withdrawal of the absorption liquid from the column is disposed above the junction of the pipeline into the first heat exchanger of the circuit in the flow direction.

The invention further provides for the use of an absorption column according to the invention for operating a plant for performing an absorption process for removal of concomitant gases from synthesis gas.

BACKGROUND

Such absorption columns are used for example in plants operating according to the Rectisol process and also in plants of the Purisol process and of the Selexol process.

The Purisol process and the Selexol process are described in principle in Ullmann's Encyclopedia of Industrial Chemistry, 6th Ed. Vol. 15, p 404-407. The Purisol process uses the organic absorption medium N-methyl pyrrolidone (NMP) and is operated at ambient temperature or at temperatures just below ambient temperature. The Selexol process uses polyethylene glycol dimethyl ether as the absorption medium.

The Rectisol process is described in principle in Ullmann's Encyclopedia of Industrial Chemistry, 6th Ed. Vol. 15, p 399 et seq. Similarly to the Purisol process for example, this process is used to purify of concomitant gases crude synthesis gas comprising carbon monoxide (CO) and hydrogen ($H_2$) and produced by for example partial oxidation of heavy oils, petroleum coke, waste products or by coal/oil residue gasification. The Rectisol process uses cryogenic methanol as the absorption medium and exploits the property of methanol that its absorptivity for the concomitants sharply increases with decreasing temperature, while its absorptivity for CO and $H_2$ remains practically constant. The undesired concomitants are principally the concomitant gases carbonyl sulfide (COS), hydrogen sulfide ($H_2S$) and carbon dioxide ($CO_2$).

These absorption processes are in many cases performed using columns in which the to-be-purified gas ascending therein is contacted with the descending absorption liquid in countercurrent. The absorption liquid is heated by the heat liberated during the absorption, thus lowering its absorptivity.

There are also applications in which a lowering of the absorptivity is desired and the absorption liquid is therefore subjected to heating. This is the case for example when previously absorbed gas is to be removed from the absorption liquid by stripping.

For cooling or heating, the absorption liquid is therefore discharged from the column at a suitable point, passed through a heat exchanger and reintroduced into the column. Transport of the liquid is effected solely utilizing the height difference between the withdrawal point and the return point into the column, since any input of mechanical energy, for example by pumping, would result in elevated bubble formation and thus in partial outgassing of the previously absorbed gas.

In order to obtain the best possible contact between the absorption liquid and the heat exchange surface of the cooler, the absorption liquid flows through the cooler from bottom to top. However, this has the result that the feed conduit into the cooler must pass through a lowermost point of inflection, often also known as a trap. In the conduit portion installed with an incline and situated upstream of the trap in the flow direction, particularly when the absorption plant is operated under part load, severe flow turbulence can lead to elevated outgassing-induced bubble formation in the absorption liquid and, particularly when the downcomer conduit is not completely filled, the liquid falling down the inclined section can entrain gas. While larger bubbles ascend in the conduit counter to the flow direction of the liquid and arrive in the column, smaller bubbles are entrained by the flow through the trap, arrive in the heat exchanger and impair heat transfer therein.

This problem has hitherto been counteracted by controlling the fill level in the portion of the feed conduit installed with an incline with a valve situated in the return line between the cooler and the column. This is intended to ensure that the inclined portion of the pipeline is always filled, thus minimizing turbulence. However, disadvantages of this solution include high capital and maintenance costs.

The invention accordingly has for its object to provide a cost effective, technically simple and reliable solution.

BRIEF DESCRIPTION OF THE FIGURE

For a further understanding of the nature and objects for the present invention, reference should be made to the following detailed description, taken in conjunction with the accompanying drawings, in which like elements are given the same or analogous reference numbers and wherein:

The FIGURE is a schematic representation of one embodiment of the present invention.

DETAILED DESCRIPTION OF THE PREFERRED EMBODIMENTS

Absorption column comprising at least one external heat exchange circuit for cooling or heating the absorption liquid, comprising one or more serially connected heat exchangers, wherein the junction of the pipeline for withdrawal of the absorption liquid from the column is disposed above the junction of the pipeline into the first heat exchanger in the flow direction, characterized in that a dumped bed is installed in the course of this pipeline.

The dumped bed prevents the absorption liquid from shooting waterfall-like down the inclined section of the feed conduit to the cooler during part-load operation, which would result in severe bubble formation and entrainment of gas. The dumped bed retards the flow rate and thus reduces the input of mechanical energy into the absorption liquid, therefore reducing bubble formation. Any bubbles nevertheless formed are caught at the surface of the packing bodies and there coalesce into larger bubbles which ascend in the circuit conduit counter to the liquid flow and arrive in the column. These effects reduce the amount of bubbles entrained into the heat exchanger. This counteracts an impairment in heat exchange in the heat exchanger.

A preferred embodiment of the absorption column is characterized in that the dumped bed consists of packing bodies. This is to be understood as meaning primarily random packing bodies such as are used for mass transfer in columns. These packing bodies are obtainable in numerous designs so that from a large choice a suitable shape, a suitable material and a suitable size may be found.

A further preferred embodiment of the absorption column is characterized in that respectively the pipeline for feeding the absorption liquid into the heat exchanger(s) joins the bottom side thereof and the pipeline for discharging joins the top side thereof. In this way the absorption liquid flows through the heat exchanger(s) from bottom to top, as a result of which fewer gas bubbles are present in the liquid and the contact between the liquid and the heat exchanger surface is disrupted by bubbles to a lesser extent.

A further preferred embodiment of the absorption column is characterized in that the withdrawal point and the return point for the absorption liquid from the column and the dumped bed and the heat exchanger(s) are arranged at such relative heights that the flow of the absorption liquid through the heat exchanger circuit is driven solely by gravity. As a result of the eschewal of pumps, less mechanical energy is transferred to the liquid which would otherwise favour bubble formation.

A further preferred embodiment of the absorption column is characterized in that the heat exchangers are each connected to a coolant, cold water or cooling water circuit or are connected as economizers to an absorption medium stream internal to the process. Thus in a specific individual case the cost-effective heat transfer medium or a combination of various heat transfer media may be used by connecting a plurality of heat exchangers in series. An economizer is a heat exchanger which brings two process streams, in this case two absorption medium streams, into heat exchange.

The invention further provides for the use of an absorption column according to the invention for operating a plant for performing a process for removal of concomitant gases from synthesis gas, for example the Rectisol, Purisol or Selexol process.

The invention further provides for the use of an absorption column according to the invention for operating a gas purification process which uses as the absorption medium mixtures of methanol and N-methyl pyrrolidone, N-methyl pyrrolidone and an amine-containing absorption medium (in particular diethanolamine, diisopropylamine, diethylamine) or methanol and an amine-containing absorption medium (in particular diethanolamine, diisopropylamine or diethylamine).

Further features, advantages and possible applications of the invention are apparent from the following description of an exemplary embodiment and the drawing. All described and/or depicted features on their own or in any desired combination form the subject matter of the invention, irrespective of the way in which they are combined in the claims and the way in which said claims refer back to one another.

The FIGURE shows by way of example an absorption column according to the invention having an external heat exchange circuit.

The construction of an absorption column according to the invention having an external heat exchange circuit shall be elucidated with reference to the drawing by way of example.

The external heat exchanger circuit 1 comprises the dumped bed 2, the heat exchangers 3 and 4 and the circuit conduit 5. The drawing further shows an absorption column 6. In this column 6 synthesis gas 7 is scrubbed by a liquid absorption medium 8. The thus treated synthesis gas 9 and the laden absorption medium 10 are discharged from the column 6 for respective further treatment (not shown). Once laden in the upper part of the column 6 and heated by the thus liberated heat of absorption, the absorption medium 8 is discharged from the column 6 and via the circuit conduit 5 passed to the dumped bed 2. The dumped bed 2 may consist for example of a dumped quantity of Pall rings, Raschig rings or inert bodies. Its purpose is to damp turbulences in the downward flow to inhibit the formation of gas bubbles and the entrainment of gas to the greatest possible extent. Otherwise the entrained gas/the gas bubbles would be carried along by the flow into the heat exchangers 3 and 4 and therein impair the contact between the absorption liquid and the heat exchange surface.

The absorption liquid flows through the heat exchangers 3 and 4 from bottom to top likewise to avoid turbulence to the greatest possible extent. The heat exchanger 3 is in this example used as an economizer and exchanges the heat of the absorption medium flowing through the circuit conduit 5 against the heat of another absorption medium stream 11 internal to the process. In this example the heat exchanger 4 operates as a cooler and is operated with a coolant 12 cooled in a coolant plant (not shown).

The opening 13 for returning the absorption medium into the column 6 via the circuit conduit 5 joins the column 6 at a height sufficiently below the opening for withdrawal 14 for the transport of the absorption liquid through the heat exchanger circuit to be achievable by gravity alone.

The invention provides a cost-effective solution for minimizing bubble formation and thus maintaining good heat exchange in the heat exchange circuit of an absorption column. The invention is accordingly industrially applicable.

LIST OF REFERENCE NUMERALS

1 Heat exchange circuit
2 Dumped bed
3 Heat exchanger (e.g. economizer)
4 Heat exchanger (e.g. cooler)
Circuit conduit
6 Absorption column
7 Synthesis gas
8 Absorption medium
9 Synthesis gas, treated
Laden absorption medium
11 Absorption medium stream internal to process
12 Coolant
13 Opening for returning absorption medium
14 Opening for withdrawal of the absorption medium It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. An absorption column comprising at least one external heat exchange circuit for cooling or heating an absorption liquid, comprising one or more serially connected heat exchangers, a first junction, a second junction, and a pipeline, wherein the first junction configured for withdrawal of the absorption liquid from the column is disposed above the second junction configured for return of the adsorption liquid from the one or more serially connected heat exchangers, wherein the pipeline fluidically connects the first junction to a dumped bed, which is fluidically connected to the one or more serially connected heat exchangers, which are fluidically connected to the second junction.

2. The absorption column according to claim 1, wherein the dumped bed comprises packing bodies.

3. The absorption column according to claim 1, wherein the first junction and the second junction and the dumped bed and the at least one heat exchanger are arranged at such relative heights that the flow of the absorption liquid through the heat exchanger circuit is driven solely by gravity.

4. The absorption column according to claim 1, wherein the one or more heat exchangers are each connected to a coolant, cold water or cooling water circuit or are connected as economizers to an absorption medium stream.

\* \* \* \* \*